Jan. 29, 1963  H. KUMPF  3,076,125
DEVICE FOR ELECTROMAGNETIC DISPLACEMENT OF
STRUCTURE WITHIN CLOSED VESSELS
Filed Dec. 15, 1959  2 Sheets-Sheet 1

Jan. 29, 1963   H. KUMPF   3,076,125
DEVICE FOR ELECTROMAGNETIC DISPLACEMENT OF
STRUCTURE WITHIN CLOSED VESSELS
Filed Dec. 15, 1959   2 Sheets-Sheet 2

United States Patent Office 3,076,125
Patented Jan. 29, 1963

3,076,125
DEVICE FOR ELECTROMAGNETIC DISPLACEMENT OF STRUCTURE WITHIN CLOSED VESSELS
Hermann Kumpf, Erlangen, Germany, assignor to Siemens-Schuckertwerke Aktiengesellschaft, Berlin-Siemensstadt, Germany, a corporation of Germany
Filed Dec. 15, 1959, Ser. No. 859,803
Claims priority, application Germany Dec. 16, 1958
7 Claims. (Cl. 317—123)

My invention relates to an electromagnetic actuator for imparting an exteriorly controllable displacement to structure located within a sealed vessel, and in a particular although not exclusive aspect to a so-called "magnetic jack" for use in nuclear reactor techniques. Such magnetic devices are based essentially upon the principle of entraining a ferromagnetic core by means of a magnetic field acting through a stationary enclosure, as will be explained with reference to FIGS. 3 and 3a of the drawing illustrating schematically a magnetic jack of simple type in longitudinal section and in cross section along line 3a—3a, respectively.

A bunch of bendingly elastic, magnetizable rods 1 is radially and axially displaceable within a non-magnetic tubular enclosure 2 whose top is sealed and whose bottom is open and comunicates with the interior of a reactor tank 3 or other sealed vessel. The bunch of rods is held in position by magnetic force, as more fully described below. A widened portion 2a of the tubular enclosure 2 accommodates a ferromagnetic entrainer sleeve 4 with axial clearance, for example, of 1 to 10 mm. Such clearance is required for the operation of the magnetic jack and constitutes the path of incremental travel available for entrainment of the bunch of rods 1 that constitutes the motion-transmitting member proper.

The wider tube portion 2a is concentrically surrounded by a set of three cylindrical magnetizing windings. The middle winding 5 serves for holding the bunch of rods. The upper winding 6 and the lower winding 7 operate as entrainer drives for imparting upward and downward motion respectively to the bunch. A winding 8 mounted on the narrower top portion of tube 2 serves as an auxiliary holding winding.

Fastened to the lower end of the bunch of rods is the structural component to be displaced or mechanically actuated, for example a regulator member 9. A shock damping device composed of annular spring elements may be interposed between the rod bunch and the structure 9.

The operation of the magnetic jack is as follows:

Assume that all windings, with the exception of the auxiliary holder winding 8, are deenergized. Then the bunch of rods 1 with the component 9 is exclusively held in position by the winding 8, due to the fact that the rods 1 are magnetically forced into frictional engagement with the tube 2 in the vicinity of winding 8. When the component 9 is to be lifted, the holder winding 5 is energized. The rods 1 are now also under magnetic force in the vicinity of the winding 5, and place themselves into frictional holding engagement with the inner bore of the entrainer sleeve 4 whose bottom rests upon the shoulder formed at the bottom of the tube portion 2a. The auxiliary holding winding 8 can now be deenergized because the rods remain held in position by their engagement with the sleeve 4. Thereafter, the upper entrainer winding 6 is energized and the rods 1 together with entrainer sleeve 4 are lifted the amount of available axial clearance until the top of sleeve 4 abuts against the upper shoulder of tube portion 2a.

Thereafter the auxiliary winding 8 is again excited so that it will hold the rods in position, and the winding 5 is deenergized. After this is done, the lower entrainer winding 7 is switched on while the upper entrainer winding 6 is switched off. As a result, the entrainer sleeve 4 moves idly downward to the starting position. This reestablishes the above-mentioned starting condition, except that the bunch of rods together with the regulating member 9 have been lifted a distance equal to the axial clearance. Further hoisting motion is brought about by repeating the above-described switching sequence as often as desired.

For lowering, the windings are switched in the following sequence, disregarding slight overlapping intervals: Winding 6 on, winding 5 on, winding 8 off, winding 7 on, winding 8 on, winding 5 off, winding 7 on.

It will be apparent that a progressive upward or downward motion takes place in individual steps with intermediate intervals of standstill. This has the consequence that the masses must always be accelerated and decelerated for each individual increment of motion. Furthermore, the switching-on and switching-off time constants of the windings impose delay upon the obtainable displacement, so that only small speeds of displacement are attainable.

It is an object of my invention to devise an electromagnetic displacing device on the principle of the magnetic jack which affords a considerably improved uniformity of displacing motion, thus reducing the mechanical stresses imposed upon the structure being moved, and which also permits increasing the travelling speed, for example by 100% or more, under otherwise comparable circumstances.

To achieve these objects, and in accordance with my invention, I provide the electromagnetic displacing device with several sets of windings and respective entrainer sleeves, each set consisting of a holding winding and two actuator windings located axially above and below the holder winding; and I electrically connect and control these windings so that the two entrainer sleeves are displaced, preferably at the same time, in respective directions toward each other and away from each other, while alternately one or the other entrainer sleeves is active to entrain the bunch of rods by magnetic action in the sense required for approaching a continuous translatory displacing motion. For moderating any remaining and appreciable irregularities of displacing motion, it is preferable to insert a suitable shock absorber between the actuating member or bunch of rods on the one hand, and the structure to be actuated on the other hand.

The foregoing and more specific features of my invention, said features being set forth with particularity in the claims annexed hereto, will be apparent from the following description of the embodiment illustrated by way of example on the accompanying drawing, in which:

FIG. 1 is an axial sectional view of an electromagnetic displacing device according to the invention, FIG. 2 is an explanatory graph representing the control program for energizing the various windings of the device, FIGS. 3 and 3a, already described above, are an axial sectional view and a cross section along line 3a—3a of a magnetic jack according to prior art; and FIG. 4 is a schematic circuit diagram of a control system applicable with a device according to FIG. 1 for performing the program according to FIG. 2.

Figure 1:
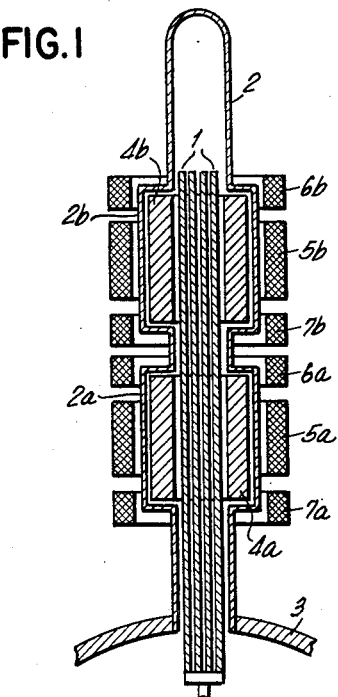
Figure 3:
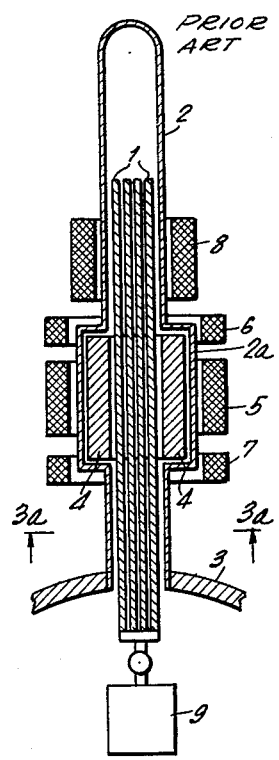
Figure 3A:

According to FIG. 1, a tubular housing 2, sealed at its top, has its bottom opening in communication with a reactor tank 3 on which the tube 2 is mounted. The tube 2 is provided with two axially sequential portions 2a and 2b of enlarged cross section. Two entrainer sleeves 4a and 4b of magnetizable material are mounted in tube portions 2a and 2b respectively, with sufficient clearance to be radially and axially displaceable in the manner described above with reference to the known magnetic jack according to FIG. 3. Mounted on the tube 2 and surrounding the respective two wider portions 2a and 2b are two sets of windings. Each set comprises a holder winding 5a or 5b and two actuator windings 6a, 7a, or 6b, 7b. The two actuator windings of each set are coaxially mounted on the two sides respectively of the holder winding.

Figure 2:
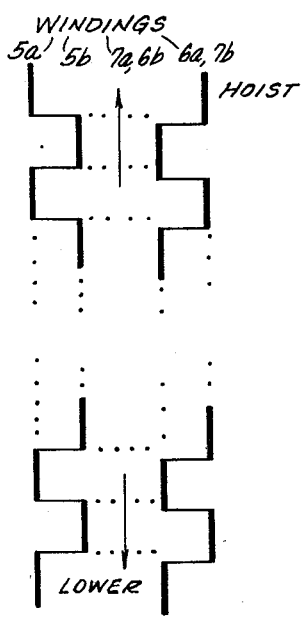

These spatially series-arranged windings are electrically energized in accordance with the control program represented in FIG. 2 in such a manner that the two entrainer sleeves 4a, 4b, during operation of the device, are moved substantially at the same time, toward each other or away from each other in the sense required to produce a progressive and approximately continuous translatory displacement of the bunch of rods 1 at the desired relatively high speed. With each reversal in sleeve travel, the sleeves 4a and 4b also reverse their respective functioning. While in one direction the bunch of rods is being entrained by one sleeve, the other sleeve runs idle. In the inner positions of the incremental displacement, the previously idle sleeve becomes active to entrain the rod.

The above-described performance and the corresponding switching sequence required for the energizing circuits of the windings is apparent from the hoisting and lowering programs indicated in FIG. 2. The heavy lines in the vertical direction indicate the intervals of time during which the particular windings are energized, these windings being identified by their reference characters along the horizontal direction of the diagram. The illustrated hoisting and lowering programs also represent the overlapping of the respective switching intervals. For example, the excitation interval for winding 5a is shown to overlap the corresponding interval for the two simultaneously excited windings 6a and 7b.

For hoisting operation, the windings 5a, 6a, and 7b are first energized, thereafter the windings 5b, 7a and 6b. Then the cycle is repeated by again energizing the windings 5a, 6a, 7b, etc., depending upon the desired total amount of displacement to be imparted to the bunch of rods 1. By correspondingly varying or adjusting the phase positions or overlapping of the two entrainer sleeves 4a, 4b, the speed of the resulting translatory motion, the acceleration characteristic, and the intermittent stoppage periods can be modified.

As apparent from FIG. 1, a shock absorber 10 is connected to the lower end of the rod bunch 1 in order to keep any occurring non-uniformities in travelling motion away from the component 9 to be actuated. The shock absorber comprises two sets of mutually tensioned disc type springs 11, 12, which are mounted in a tubular housing 13 closed at both ends. A piston 14 is slidably seated in housing 13 between the two sets of disc springs and is joined with a connecting fork 16 by means of a bolt 15 which extends through the housing and slides in respective elongated slots of the housing wall. The damping liquid active in the shock absorber may consist of water. That is, when applying the device to a nuclear reactor, the shock absorber may be located within the cooling water.

The disc springs 11, 12 have ground, planar front faces between which the water must be squeezed out when the column of springs is being subjected to compression. This produces the damping action which can be adjusted or regulated, with respect to the desired hardness or softness of shock absorption, by accordingly dimensioning the cross section of a connecting bore or groove of the piston.

It is obvious that a great variety of control circuits and control devices, such as rotating program controllers or electronic pulse generators are available for energizing the windings in the proper sequence as exemplified by the control programs of FIG. 2. For examples of suitable control circuitry, reference is made to FIGS. 4 to 6.

Figure 4:
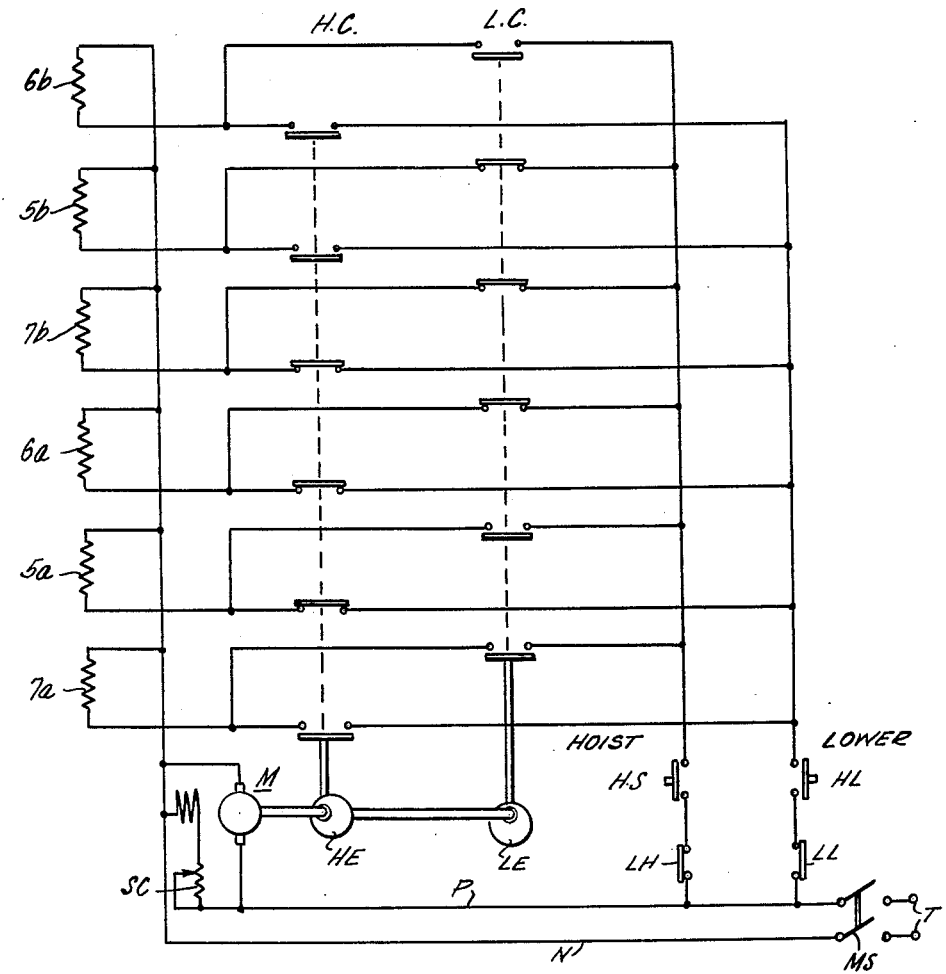

The control system, according to FIG. 4, has line terminals T for connection to a suitable source of current, preferably direct current of constant voltage. Closing of the main switch MS energizes the positive and negative leads P and N to which the windings 5a, 5b, 6a, 6b, 7a, 7b are connected under control by a hoisting contactor HC and a lowering contactor LC whose respective sets of contacts are driven by eccentrics or cams HE and LE actuated by a motor M. The motor M is energized when main switch MS is closed, thus placing the two contactors HC and LC into periodic operation, the speed of this operation being adjustable by means of a speed controller SC. However, as long as two controlling push button switches HS and HL are open, none of the six windings is energized. Actuation of the push button HS causes the hoist contactor HC to energize the windings in accordance with the hoist control program in FIG. 2 described above. Actuation of the push button HL causes the lowering program according to FIG. 2 to be put in operation. The two push button contacts HS and HL are preferably interlocked so that only one of them can be actuated at a time. The device will continue operating as long as one of the respective push button switches is kept depressed, the switch being spring-biased to open position. Limit switches LH and LL are preferably provided in the conventional manner for deenergizing the control system when bunch of rods 1 has reached one or the other of its travel limits.

Figure 5:
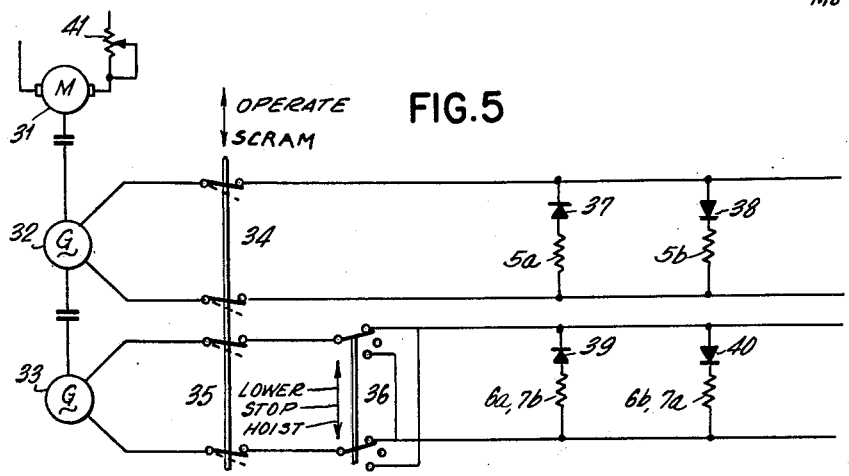
FIG. 5 is a circuit diagram of another control system.

The control system illustrated in FIG. 5 avoids the use of periodically operating contact devices and effects the hoisting and lowering by means of phase-displaced alternating currents, thus affording a higher operating speed if desired, and a better uniformity of translatory motion.

The system comprises an electric motor 31 whose speed is variable by means of a speed controller 41 for correspondingly varying the hoisting lowering speed. The motor 31 drives two alternating current generators 32 and 33 so connected with each other that the respective generator output voltages are mutually phase-displaced. The alternator 32 energizes through a switch 34 the two holder windings 5a and 5b in series with respective rectifier diodes 37 and 38 of mutually opposed poling. As a result, the respective voltages applied to the holder windings 5a and 5b are 90° phase-displaced from each other as is indicated by the voltage curves $V_1$ and $V_2$ in FIG. 6. The switch 34 is normally in the illustrated operating condition. In an emergency, switch 34 is shifted to the "scram" position in which both holder windings 5a and 5b are deenergized so that the regulator rods drop into the reactor core under their own weight. The switch 34 is preferably actuated automatically by the safety device of the reactor.

The second alternator 33 energizes the windings 6a, 7b and 6b, 7a through respective rectifier diodes 39 and 40 of mutually opposed poling. A switch 35, connected with switch 34 to operate simultaneously therewith, is interposed between the alternator 33 and the latter group of windings, in series relation to a selector switch 36 which permits changing the sequence of the voltage half-waves in order to set the system selectively for lowering or hoisting operation. In the middle position of selector switch 36, the windings 6a, 7b, 6b, 7a are deenergized so that only the holder windings 5a and 5b are excited, whereby the structure actuated by the device is kept at standstill. The switch 35 also opens its contacts when the protective device of the reactor issues a scram signal.

Figure 6:
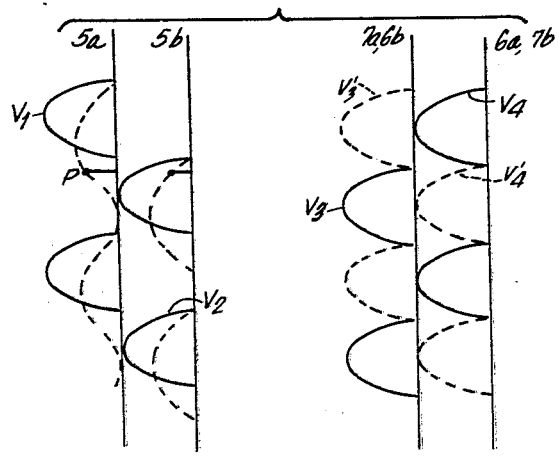
FIG. 6 is an explanatory voltage diagram relating to the system of FIG. 5.

In FIG. 6, the voltage applied to windings 7a, 6b is denoted by $V_3$, and the voltage applied to windings 6a, 7b by $V_4$. The full-line voltage curves $V_3$, and $V_4$ apply to hoisting operation, and the broken-line curves $V'_3$, $V'_4$ to lowering operation. The broken-line curves superimposed upon the voltage half-waves $V_1$ and $V_2$ indicate the holding force effected by the windings 5a and 5b. As shown at time point P, the holding forces of the two windings 5a and 5b overlap relative to time so that, when switch 34 is closed a continuous holding force is always imposed upon the bunch of mods.

It will be obvious to those skilled in the art, upon a study of this disclosure, that electromagnetic displacing devices according to my invention permit of various modifications with respect to design details and the particular use to which these devices are put, without departing from the essential features of my invention and within the scope of the claims annexed hereto.

I claim:

1. An electromagnetic jack for displacing structure in the interior of a vessel, comprising a tubular housing having an open end for communication with the vessel, an actuator having means for attachment to the structure to be displaced and comprising a bunch of bendingly elastic and magnetizable metal rods axially displaceable in said housing with radial clearance, several magnetizable sleeves axially spaced from each other and surrounding said actuator in said housing, each of said sleeves being axially displaceable a fixed amount relative to said housing, several sets of magnetizing windings surrounding said tubular housing near said respective sleeves, each set having a holder winding for magnetically attaching said actuator to one of said respective sleeves and two control windings disposed coaxially on opposite sides respectively of said holder winding and magnetically operable upon said sleeve for shifting it axially in one and the other direction depending upon which of said two control windings is energized at a time, and electric energizing circuit means connected with said sets of windings and having sequencing means for alternately energizing first one of said two control windings of each set so as to move said sleeves towards each other and then the other control winding on each of said sets so as to move said sleeves away from each other, whereby said sleeves are axially shifted towards and away from each other in alternate succession, and simultaneously energizing only one of said respective holder windings each time the sleeves are shifted to cause progressive translatory motion of said actuator.

2. An electromagnetic jack for hoisting and lowering structure in the interior of a vessel, comprising a tubular housing of non-magnetic material extending vertically when in operative condition, said housing being sealed at the top and having an opening at the bottom for communication with the top of the vessel, an actuator of elongated shape coaxially disposed and axially displaceable in said housing and having a portion protruding downwardly from said opening for attachment to the structure to be hoisted and lowered, said actuator comprising a bunch of bendingly elastic rods of magnetizable metal and having radial clearance, relative to said housing several magnetizable sleeves axially spaced from each other in said housing and surrounding said bunch, each of said sleeves being axially displaceable in said housing, said housing having stop means engageable by said sleeves and limiting the axial displacement of each, two sets of magnetizing windings magnetically associated with said respective sleeves, each of said sets having a holder winding located about midway between the axial ends of one of said sleeves for causing said sleeve to frictionally engage said bunch when magnetized, and each set having two control windings on opposite axial sides of said holder winding, an electric energizing circuit connected with said sets of windings and having selective sequencing means for alternately energizing first one of said control windings of each set to move said sleeves towards each other and then energizing the other control winding of each set to move said sleeves away from each other and simultaneously energizing only one of said holder windings at a time for progressive translatory displacement of said actuator.

3. An electromagnetic jack according to claim 1 for use with a liquid-containing vessel, said attachment means of said actuator comprising a hydraulic shock absorber fastened to said actuator at a location outside said housing and below the liquid level of the vessel, said absorber having disc-shaped springs forming variable-volume chambers between each other, said chambers having openings for communication with the vessel space whereby the liquid in the vessel acts as damping liquid in said absorber.

4. An electromagnetic jack according to claim 1 wherein said electric energizing means include the current source and wherein said sequencing means include a plurality of switches each connected in series with one of said windings and said source, and motor means for opening and closing said switches in a predetermined order to produce progressive translatory motion of said actuator in a predetermined direction.

5. An electromagnetic jack according to claim 4 wherein said sequencing means include a second plurality of switches each connected in series with one of said windings and connected parallel to the first plurality of switches, connector means for alternately connecting said source to said windings by means of said first plurality of switches and then by means of said second plurality of switches while disconnecting said first plurality of switches, said motor means being connected to said second plurality of switches for opening and closing them in predetermined order whereby by operation of said connector means the direction of progressive translatory movement of said actuator may be reversed.

6. An electromagnetic jack according to claim 1 wherein said energizing means include a pair of generators and wherein said sequencing means include motor means for turning said generators in phase relation relative to each other, one of said generator means being connected to said holder windings, diode means between each of said holder windings and one of said generator means, the second one of said generator means being connected to said control windings, diode means connected between said control windings and said generator, and switch means adapted to reverse the polarity applied by the second one of said generators across said control windings, whereby the half-wave output from said generators serves to alternately energize said holder windings and to alternately energize said control windings in a predetermined order.

7. An electromagnetic jack for a displacing structure in the interior of a vessel, comprising a tubular housing having an open end for communication with the vessel, an actuator having means for attachment to the structure to be displaced and comprising a bunch of bendingly elastic and magnetizable metal rods axially displaceable in said housing with radial clearance, several magnetizable sleeves axially spaced from each other and surrounding said actuator in said housing, each of said sleeves being axially displaceable a fixed amount relative to said housing, several sets of magnetizing windings surrounding said tubular housing near said respective sleeves, each set having a holder winding for magnetically attaching said actuator to one of said respective sleeves, and control winding means disposed coaxially relative to said holder winding and magnetically operable upon said sleeve for shifting it axially in one and the other direction, and electric energizing circuit means connected with said sets of windings and having sequencing means for energizing said control winding means to move said sleeves alternately towards and away from each other and for simultaneously energizing only one of said respective holder windings during each movement of said sleeves to cause progressive translatory motion of said actuator.

References Cited in the file of this patent
UNITED STATES PATENTS 2,987,656    Handshuh et al. _____ June 6, 1961